Nov. 2, 1971     G. D. LA MASTERS     3,616,783

VAPOR CONTROL VALVE

Filed March 6, 1970

INVENTOR
GEORGE D. LaMASTERS

BY Herman E. Smith

ATTORNEY

United States Patent Office 3,616,783
Patented Nov. 2, 1971

3,616,783
VAPOR CONTROL VALVE
George D. La Masters, Decatur, Ill., assignor to
Borg-Warner Corporation, Chicago, Ill.
Filed Mar. 6, 1970, Ser. No. 17,092
Int. Cl. F02m 59/00
U.S. Cl. 123—136                    2 Claims

ABSTRACT OF THE DISCLOSURE

A multifunction valve for controlling vapor from a fuel tank, opens at a first pressure permitting vapor flow toward vapor collecting apparatus and remains open until the pressure has dropped to a second lower pressure; in addition a check valve is provided to compensate for negative pressure or lowering of fuel level, and a safety relief valve is provided to protect the tank and system from excessive pressure.

SUMMARY OF THE INVENTION

The present invention relates generally to a valve and more particularly to a vapor control valve for use in an emission control system for a motor vehicle.

Emission control systems for motor vehicles are directed toward reducing airborne contaminants, one source of which arises from volatile fuel evaporated from a fuel tank.

An object of the present invention is to provide an improved vapor control valve particularly adapted for controlling the release of vapor from a fuel tank; a further object of the invention is to provide a multifunction valve for an emission control system; an additional object of the invention is to provide a control valve for a fuel system which protects the system against both vacuum and dangerous overpressure, and also conducts volatile vapors to a selected portion of the system; another object of the invention is to provide a pressure responsive valve which is quiet in operation, which is operable at low pressures, and which includes means for delayed response to pressure changes. Other objects and advantages of the invention will become evident from consideration of the following description together with the drawing.

DESCRIPTION OF THE PREFERRED EMBODIMENT

Figure 1:
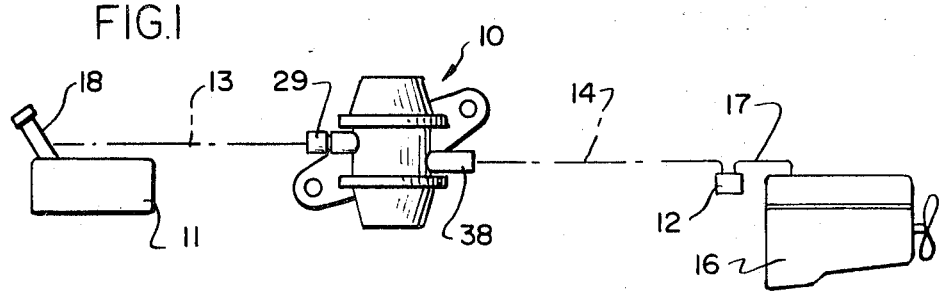
FIG. 1 is a schematic diagram of a portion of an emission control system for a motor vehicle.

Referring now in more detail to the drawing, a multifunction valve 10 is indicated as connected to a fuel tank 11 and a vapor collecting apparatus 12 by lines 13, 14 forming a portion of an emission control system for the fuel system of an internal combustion engine 16. As shown, the vapor collector 12 is connected to engine 16 by means of line 17. Volatile vapor from fuel tank 11 may be conducted to the valve cover of engine 16 where it becomes mixed with crankcase vapors before undergoing further processing as by induction into the engine for combustion. An alternative is to provide for adsorbing the fuel tank vapor in a collector such as 12 and introducing the vapor into the air intake system of the engine during moderate to high fuel demand periods. In either event, the multifunction valve 10, to be described in greater detail hereinafter, is connected to an upper vapor trapping portion of a fuel tank such as the filler neck 18, and communicates such vapor to a vapor collecting means for further processing in an emission control system.

The body of valve 10 includes a mounting bracket portion 21 provided with a pair of apertures 22, 23 facilitating mounting of the valve. A cylindrical body portion 24 is formed integrally with bracket portion 21, and includes an internal cylindrical wall 26 terminating in a pair of annular lips or flanges 27, 28. An inlet tube 29 is formed integrally with the body portion 24 and communicates with the cavity or vapor chamber 31 formed internally of the valve body by the cylindrical wall 26.

A pair of vent ports 32, 33 are formed integrally with body portion 24 and extend axially substantially coaxially with respect to the cylindrical surface 26, each terminating in a respective annular seat 34, 36 located near the transverse plane of a respective flange 27, 28. Vent port 33 communicates with an exit passage 37 extending externally of body portion 24, and vent port 32 communicates with an outlet tube 38. As shown, exit passage 37 communicates directly with atmosphere, however, the structure may be adapted, if desired, to connect the exit passage with other apparatus in an emission control system.

The junction of body portion 24 with bracket portion 21 includes a planar wall portion 39 having a group of apertures 41 extending therethrough into vapor chamber 31. As shown, bracket portion 21 is hollow, communicating with apertures 41 with atmosphere through a filter material 42. An umbrella type check valve 43 is secured to wall portion 39 having a flexible flap portion 44 covering the apertures 41. When a negative pressure condition occurs in vapor chamber 31, the flap portion 44 permits entrance of atmospheric air through apertures 41 for avoiding vacuum in the valve body, however, a positive pressure in vapor chamber 31 urges flap portion 44 toward sealing engagement with wall portion 39 to prohibit flow of vapor outwardly through apertures 41. While a particular form of check valve has been shown and described, other suitable forms of check valves may be employed if desired.

Figure 2:
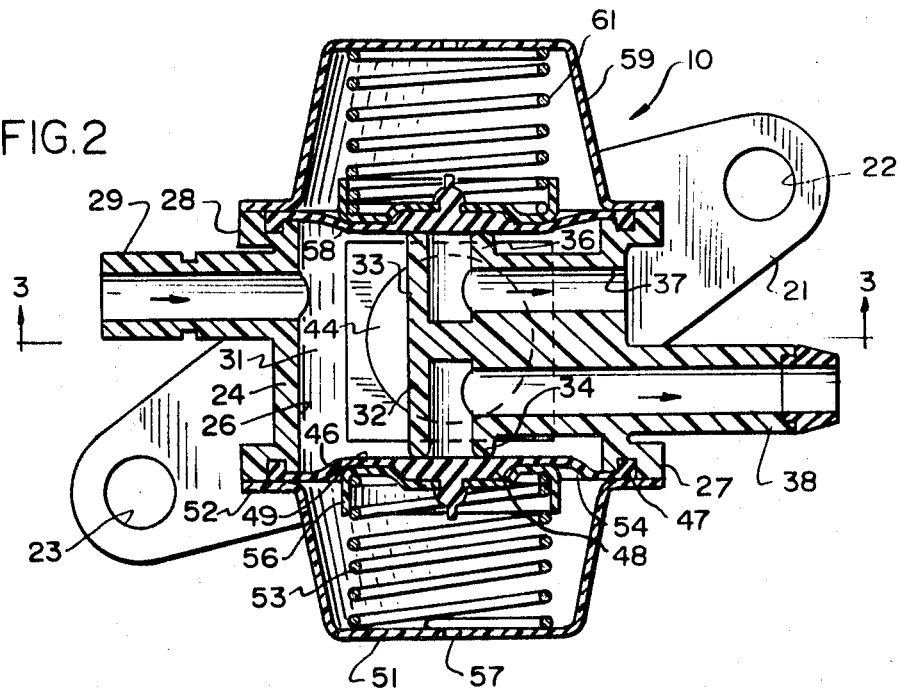
FIG. 2 is a section view of a multifunction control valve according to the present invention.
Figure 3:
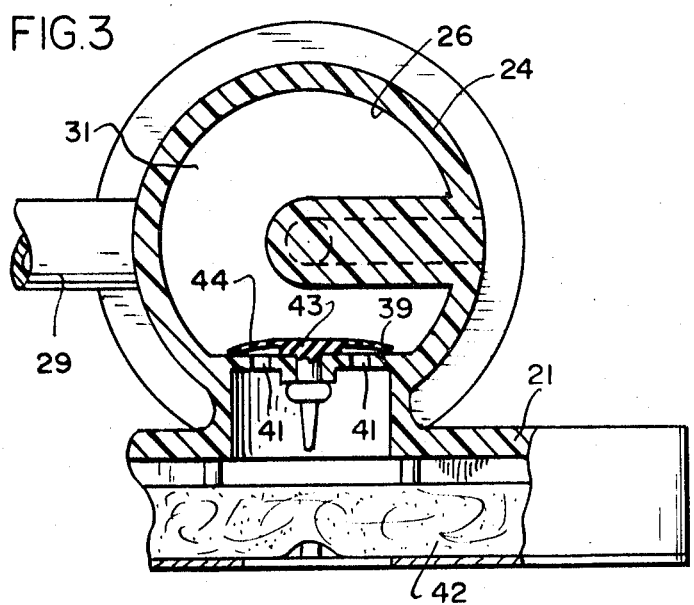
FIG. 3 is a section view taken along the line 3—3 of FIG. 2.

Referring now to FIG. 2, a flexible circular diaphragm 46, includes a peripheral bead 47 engaged with annular lip 27. The diaphragm extends across one end of body portion 24 further enclosing and defining vapor chamber 31. A mid-portion 48 of diaphragm 46 has an inner face 49 engageable with annular seat 34 of vent port 32. An end cap or housing 51 includes a flange portion 52 which overlaps the margin of diaphragm 46 and is secured to annular lip 27 thereby securing the diaphragm to the valve body. A preload spring 53 has one end bearing against housing 51 and an opposite end bearing against the outer face 54 of diaphragm 46 by means of the spring seat 56. Spring 53 thus urges diaphragm 46 toward sealing engagement with annular seat 34 preventing communication between vapor chamber 31 and vent port 32. The occurrence of a positive pressure in vapor chamber 31 results in a force in opposition to spring 53 which is proportional to the pressure and an annular area defined by the outer circumference of vent port seat 34 and the inner circumference of cylindrical wall 26. When the force exceeds the preload of spring 53, the diaphragm is moved to an open position out of engagement with annular seat 34 permitting communication between vapor chamber 31 and vent port 32. Housing 51 includes an orifice 57 which restricts the flow of air in and out of the housing as diaphragm movement occurs thereby dampening rapid oscillation or flutter of the diaphragm.

The end of body portion 24 adjacent flange 28 is provided with a second diaphragm 58, a second cap 59, and a second preload spring 61 similar to the elements described above which cooperate with annular seat 36 to provide a safety relief valve, for the emission control system. The properties of spring 61 and the effective area of diaphragm 58 are selected to define a maximum pressure above which the multifunction valve 10 will receive through the exit passage 37. While it is preferred to proivde a safety relief valve as shown, other forms of safety relief valves may be employed.

OPERATION

The advantages provided by the present valve can be more fully understood through consideration of its operation in combination with an emission control system, as more fully set forth in the following example.

As the temperature of the surroundings increases, the fuel in tank 11 begins to expand and evaporate creating a vapor pressure which causes vapor to flow from an upper vapor trapping portion of the tank through line 13 and inlet tube 19 into vapor chamber 31 of valve 10. The vapor in chamber 31 exerts a pressure on an annular area of diaphragm 46 bounded by the wall 26 and the seat 34. The pressure increases with temperature to a first predetermined level such as 0.3 p.s.i. at which diaphragm 46 begins to move slowly toward its open position, compressing spring 53 and expelling air entrapped in housing 51 through orifice 57, and allowing vapor to enter vent port 32. When the diaphragm 46 is moved to open position, the pressure such as 0.3 p.s.i. in chamber 31 is exerted on the full area of the diaphragm inclduing the additional area corresponding to the annular seat 34 such that the diaphragm is held open even though the pressure in chamber 31 is diminishing as a result of vapor flow into vent port 32. When the pressure in chamber 31 has dropped to a second lesser level, such as 0.29 p.s.i., diaphragm 46 begins to move toward its closed position for sealing vent port seat 34, but is retarded in movement as air is drawn into cap 51 through orifice 57. Once diaphragm 46 is reseated against annular seat 34 to effect a seal as in the original condition, the pressure must again build up to the higher level before the diaphragm will again move to open position, thus avoiding flutter in the operation of the diaphragm.

Typically the operation of valve 10 is such that vapor from tank 11 is relieved through vent port 32, outlet tube 38 and line 14 to a vapor collector such as 12 or mixed with vapor from other sources such as in the valve cover of an engine. Under unusual circumstances, vapors from other sources in the system may exert a pressure in outlet tube 38 and vent port 32 which is higher than the selected operating pressure. The arrangement of vent port 32 and diaphragm 46 is such that back pressure in line 14 is prevented from flowing back to the fuel tank. The back pressure can be checked in excess of 1.5 p.s.i. due to the area ratio of the seat 32 and the effective area of diaphragm 46 in combination with the preload of spring 53. The purpose of checking the back pressure is to prevent flow of contaminants from the engine back to the fuel tank.

Under the unusual condition of a high pressure created in the tank, or where portions of the system have been blocked preventing normal flow, it is desirable to provide a back-up safety relief valve such as the second vent port 33 and second diaphragm. 58. For example, the relief valve is designed to open at a higher pressure such as 0.7 p.s.i. and remain open until the pressure has dropped to a lower level such as 0.69 p.s.i. thus protecting the fuel tank from rupture.

As the level of fuel is lowered in tank 11, as a result of use or a decrease in surrounding temperature, a negative pressure or vacuum condition may result in vapor chamber 31. The umbrella check valve 43 or other suitable check valve is arranged to permit an influx of air into chamber 31 to overcome such a negative pressure condition.

Thus a multifunction valve is provided which permits air to enter the tank to compensate for fuel consumed, which permits vapor to pass from the tank to vapor collecting apparatus, and which provides safety relief in case of excessive pressure in the system.

What is claimed is:

1. A vapor control valve comprising a body including an internal substantially cylindrical wall portion having an annular lip defining in part, a vapor chamber therein adapted for connection to a vapor trapping portion of a fuel tank; a one way check valve extending through said wall portion, permitting influx of atmosphere into said vapor chamber in response to a negative pressure therein; a tubular vent port arranged and disposed substantially coaxially with respect to said cylindrical wall portion and terminating in an annular seat, said vent port being adapted for communication with vapor collecting means in a fuel system; a flexible diaphragm secured to the annular lip of said cylindrical wall portion with one face thereof further defining said vapor chamber, said diaphragm having a mid-portion of said one face engageable with the annular seat of said vent port adapted to provide selective communication between said vent port and said vapor chamber; and resilient yieldable preload means in engagement with the opposite face of said diaphragm urging said diaphragm mid-portion toward sealing engagement with said vent port annular seat, said diaphragm being movable to an open position in which said mid-portion is out of engagement with said vent port seat in response to a first predetermined pressure in said valve body vapor chamber, and remaining in said open position until the pressure in said valve body has dropped to a second pressure lower than said first pressure.

2. A vapor control valve according to claim 1, in which said valve body includes a pressure responsive safety relief valve arranged for relieving said vapor chamber to atmosphere in response to the occurrence of an overpressure condition in said vapor chamber.

References Cited

UNITED STATES PATENTS

| 3,518,977 | 7/1970 | Smith | 123—136 |
| 3,039,485 | 6/1962 | Brohl | 123—136 X |
| 3,520,321 | 7/1970 | Skoli et al. | 251—61.1 X |
| 3,115,114 | 12/1963 | Rapplean et al. | 123—136 |
| 3,100,002 | 8/1963 | Moore | 251—61.1 |

MARK M. NEWMAN, Primary Examiner

C. R. FLINT, Assistant Examiner

U.S. Cl. X.R.

251—61.1